UNITED STATES PATENT OFFICE.

FRANCIS VINCENT GREENE, OF PHILADELPHIA, PENNSYLVANIA.

PROCESS OF EXTRACTING THE OIL AND ALBUMINOID MATTER FROM CORN.

SPECIFICATION forming part of Letters Patent No. 313,665, dated March 10, 1885.

Application filed November 20, 1884. (Specimens.)

*To all whom it may concern:*

Be it known that I, FRANCIS VINCENT GREENE, a citizen of the United States, residing at Philadelphia, in the county of Philadelphia and State of Pennsylvania, have invented a process for obtaining, in a separate state and upon a commercial scale, two valuable substances contained in maize or Indian corn; and I do hereby declare that the following is a full, clear, and exact description of the invention.

My invention relates to the extraction of the oil and fat and the albuminoid matter from corn, and is designed to be applied to the obtaining of these substances, as by-products of the manufacture of starch, spirits, &c. The process consists in, first, the production of an emulsion of the substances to be extracted; second, the elimination of the water; and, third, the separation of the substances. By steeping corn in water at or above atmospheric temperature and bruising it, or by grinding it and then macerating it in water, what is technically known as "starch-milk" is produced. From this the starch separates by subsidence and a milky liquid remains, which in the manufacture of starch is generally a waste product, and unless disposed of creates a nuisance in the summer months by its decomposition. This milky liquid I have discovered to be an emulsion of a greater or less proportion of the oil and albuminoid matter of the grain. I have also discovered that the richness of this emulsion is increased where partial fermentation of the grain is adopted, owing to the acid reactions produced. I have, however, found that the best results are attained by the use of chemicals.

Dilute solutions of alkalies, as ammonia or caustic soda; weak solutions of acids, as sulphurous acid; certain salts, as sulphate of soda, are now used in the manfacture of starch in some cases for the purpose of purifying the starch, and I propose to use them to obtain the above-mentioned by-products.

In order to free the combined oil and albuminoid matter from the water, the emulsion is conveyed into a suitable receptacle and the albuminoid matter is precipitated, carrying the oil with it. This may be accomplished by heat or by the use of chemicals, as common salt or sea water, or dilute mineral acids, preferably in conjunction with heat. I have, however, discovered that the best method of accomplishing the result chemically is by the use of a salt of alumina, preferably the sulphate, and that the precipitation takes place more readily and effectively after slight fermentation has occurred. By permitting further fermentation than in the above case a separation of the suspended matter occurs spontaneously, a creamy portion rising to the surface, which is much richer than the remainder which precipitates. This creamy portion is then removed and treated by the methods for treating the precipitate described below. I do not desire, however, to confine myself to the above methods of eliminating the water, as it may be accomplished mechanically by filtration. The oil may be separated from the albuminoid matter by pressure, or by dissolving out the oil from the dried precipitate by benzine, bisulphide of carbon, &c. Where pressure is used, the supernatant liquid may be simply run off and the moist residuum subjected to pressure, expelling the water and oil together. The oil will then rise to the surface of the water and may be readily separated. This separation of the water and oil may be accelerated by heat or by revolving them rapidly in a drum. A portion of the residual moisture in the precipitate may be first removed by a centrifugal drier.

In the manufacture of spirits from corn, the residue, after distillation, may be treated in the manner described above and the emulsion obtained from it; or the corn may be first treated and the emulsion separated, the starch and hulls being used for the mash.

The albuminoid substance extracted is valuable as a fertilizer, and may by further treatment be converted into other products.

I am aware that dilute acids have been tried for the purpose of precipitating the suspended matter in the milky liquid produced in the manufacture of starch for the purpose of rendering it salable when mixed with the hulls for cattle food; but the process has never been put in practice on a commercial scale, owing to the expense proving prohibitory.

As some albuminous matter may remain dissolved in the supernatant liquid after precipitation by some of the above methods, and would by its decomposition become offensive, I therefore precipitate it by the use of acids, and thus attain one of the objects of my invention—the prevention of the nuisance which the present disposition of these residues creates.

Although I have specified corn as adapted to the application of my invention, it is manifest that it is also applicable to other grains, although the percentage of oil contained in them is so small as to render it doubtful whether the process could be profitably employed. I therefore intend that the word "corn," as herein used, shall comprehend any natural product containing oil and albuminoid matter, to which the herein-described process is applicable.

I claim as my invention—

1. The process of extracting the oil from corn through the medium of an emulsion of it with the albuminoid matter.

2. The process of extracting the albuminoid matter from corn through the medium of an emulsion of it with the oil.

3. The process of precipitating the oil and albuminoid matter of corn from an emulsion by the use of heat, for the purpose specified.

4. The process of precipitating the oil and albuminoid matter of corn from an emulsion by the use of acids, for the purpose specified.

5. The process of precipitating the oil and albuminoid matter of corn from an emulsion by the use of common salt or sea water, for the purpose specified.

6. The process of precipitating the oil and albuminoid matter of corn from an emulsion by the use of a salt of alumina, for the purpose specified.

7. The process of separating the oil and albuminoid matter of corn from an emulsion by filtration, for the purpose specified.

8. The process of extracting the oil from the albuminoid matter of corn by means of solvents, for the purpose specified.

9. The process of extracting the oil from the albuminoid matter of corn by means of pressure, for the purpose specified.

10. The process of separating the emulsion of the oil and albuminoid matter of corn into a creamy portion and a precipitate by fermentation, for the purpose specified.

11. The herein-described process of extracting the oil and albuminoid matter of corn from distillery refuse in the form of an emulsion, for the purpose specified.

12. The herein-described process of extracting the oil and albuminoid matter from corn by obtaining them in the form of an emulsion, freeing them wholly or partially from water, and then separating them.

FRANCIS VINCENT GREENE.

Witnesses:
ROBERT H. NEILSON,
WM. D. NEILSON.